Aug. 9, 1938.  H. A. BERLINER  2,125,881
FORMING MACHINE
Filed March 17, 1937
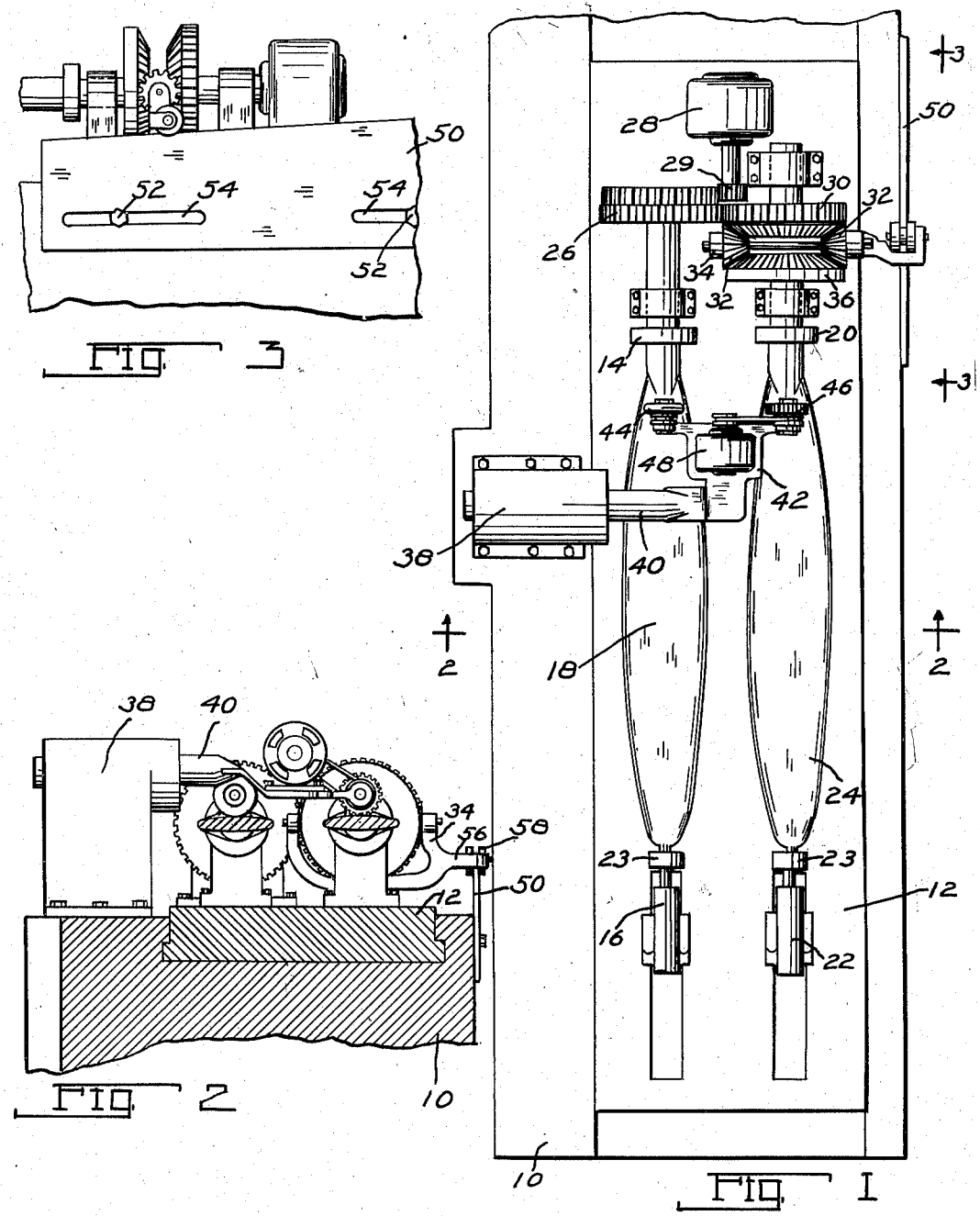
INVENTOR.
HENRY A. BERLINER
BY McConkey & Booth
ATTORNEYS.

Patented Aug. 9, 1938

2,125,881

UNITED STATES PATENT OFFICE 2,125,881

FORMING MACHINE

Henry A. Berliner, Washington, D. C.

Application March 17, 1937, Serial No. 131,312

14 Claims. (Cl. 90—13.3)

This invention relates to forming machines and more particularly to machines in which a work piece is formed as a duplicate of a pattern.

A principal object of the invention is to provide a forming machine in which a pattern and work piece may be adjusted relatively to each other during operation to change the shape of the work piece relatively to the pattern. This feature is useful in the forming or finishing of propeller blades so that blades of different pitch can be made from the same pattern and will all have the same section as the pattern.

One machine embodying the invention includes a longitudinally movable table supporting a pattern and work piece for rotation about parallel axes. A pivotally mounted carriage carries a follower to engage the pattern and a forming tool to engage the work piece, an electric motor preferably being mounted on the carriage to drive the forming tool and to balance the carriage in such a manner as to insure proper pressure on the forming tool.

The pattern and work piece are geared together for rotation in the same direction and are driven by a motor on the table. The gearing includes a movable element, such as a rotatable gear carrier in a differential gear, which is turned by means of a cam as the table moves to turn the pattern and work piece relatively to each other. This alters the pitch of the work piece relative to that of the pattern without changing the sectional configuration which is to be given the work piece.

Other objects, advantages and novel features of the invention, including various novel subcombinations and particular features, will appear from the following description of the accompanying drawing, in which:

Figure 1 is a partial plan view of a forming machine embodying the invention;

Figure 2 is a partial section on the line 2—2 of Figure 1; and

Figure 3 is a partial elevation looking in the direction of the arrows 3—3 in Figure 1.

The illustrated machine includes a base 10 slidably supporting a table 12 for straight-line movement. The table 12 carries a pattern support including a rotatable headstock 14 and a tail stock 16 rotatably mounting a pattern 18 in the form of a propeller blade to be copied. A similar headstock 20 and tailstock 22 rotatably support a work piece or blank 24 which may be a rough metal forging, a built up wooden piece or the like. The tailstocks 16 and 22 carry rotatable shafts carrying suitable chucks 23 for supporting the ends of the pattern and work piece.

The headstock 14 is connected to a double pinion 26 which may be driven by an electric motor 28 or other suitable power means through a pinion 29 on the motor shaft and which meshes with a compound bevel pinion 30. A pair of planet pinions 32 carried by a framework or gear carrier 34 mesh with the pinion 30 and with a second bevel pinion 36 which is connected to the headstock 20. If the gear carrier 34 is held against rotation and the motor 28 is operating the pattern 18 and work piece 24 will be rotated in the same direction at the same speed as will be apparent.

The base 10 carries a mounting bracket 38 in which a rod 40 is journaled about an axis at right angles to the table 12. The rod 40 is rigidly secured to a carriage 42 which is offset from the axis of the rod and on which a follower 44 and a forming tool 46 are rotatably mounted about axes parallel to the table 12. The follower is adapted to engage the pattern 18 to control the pivotal position of the carriage and the forming tool is adapted to engage the work piece 24 to shape it in accordance with the shape of the pattern. An electric motor 48 mounted on the carriage 42 serves to drive the forming tool 46 and serves by its weight, to maintain proper cutting pressure thereon at all times.

In order to rotate the work piece and pattern relatively to each other to change the pitch of the work piece, a cam plate 50 is secured to the base 10 by means of screws or the like 52 passing through slots 54 in the cam plate and fastened to the base. The gear carrier 34 has an extension 56 carrying a roller 58 to engage the cam plate so that as the table moves the gear carrier will be turned to turn the work piece relatively to the pattern.

In operation the table 12 will be moved longitudinally by any suitable means which may be operated by the motor 28 as will be understood by those skilled in the art. At the same time the motor 28 turns the pattern and work piece about their respective axes and the motor 48 drives the forming tool 46 to form the work piece in the same shape as the pattern. If the face of the cam 50 is parallel to the table, the carrier 34 will not be turned and the work piece will be formed with the same cross-sectional shape and the same pitch as the pattern. However, when the face of the cam 50 is at an angle to the table as shown, the work piece will be turned relatively to the pattern as the table 12 moves along to provide a blade of different pitch than the pattern. It will be understood that cams of different shape can be substituted for the cam 50 so that the work piece can be formed with any desired pitch or variation of pitch from the same pattern.

While only one embodiment of the invention has been shown and described it will be apparent that many changes might be made therein and it is not intended to limit the scope of the invention to the exact form shown or otherwise than by the terms of the appended claims.

What is claimed is:

1. A forming machine comprising means for rotatably supporting a work piece, means for rotatably supporting a pattern, power means for synchronously rotating the work piece and pattern, a carriage movable toward and away from the pattern and work piece and carrying a follower engageable with the pattern and a forming tool engageable with said work piece, said pattern guiding movement of the carriage, said pattern and work piece being movable lineally relative to the carriage, and means operated by said lineal movement for turning the work piece and pattern relatively to each other.

2. A forming machine comprising means for rotatably supporting a work piece, means for rotatably supporting a pattern, power means for synchronously rotating the work piece and pattern, a carriage movable toward and away from the pattern and work piece and carrying a follower engageable with the pattern and a forming tool engageable with said work piece, said pattern guiding movement of the carriage, said pattern and work piece being movable lineally relative to the carriage, a cam movable relative to said pattern and work piece, and means including a member movable with the pattern and work piece engaging said cam to turn the pattern and work piece relatively to each other.

3. A forming machine comprising means to support a pattern and work piece for rotation about parallel axes, a carriage carrying a follower and a forming tool engageable with the pattern and work piece respectively, said means being movable relative to the carriage in a direction parallel to said axes, and means operated by said relative movement of the first named means to turn the pattern and work piece relatively to each other.

4. A forming machine comprising means to support a pattern and work piece for rotation about parallel axes, a carriage carrying a follower and a forming tool engageable with the pattern and work piece respectively, said means being movable relative to the carriage in a direction parallel to said axes, a cam and means including a member carried by said first named means engageable with said cam to turn the pattern and work piece relatively to each other.

5. A forming machine comprising means to support a pattern and work piece for rotation about parallel axes, a carriage carrying a follower and a forming tool engageable with the pattern and work piece respectively, said means being movable relative to the carriage in a direction parallel to said axes, gear means connecting the pattern and work piece for synchronous rotation, and means operated by said relative movement of the first named means to turn an element of said gear means thereby to turn the pattern and work piece relatively to each other.

6. A forming machine comprising means to support a pattern and work piece for rotation about parallel axes, a carriage carrying a follower and a forming tool engageable with the pattern and work piece respectively, said means being movable relative to the carriage in a direction parallel to said axes, gear means connecting the pattern and work piece for synchronous rotation, a cam, and a member carried by an element of said gear means and engageable with said cam to turn the pattern and work piece relatively to each other.

7. A forming machine comprising means to support a pattern and work piece for rotation about parallel axes, a carriage carrying a follower and a forming tool engageable with the pattern and work piece respectively, said means being movable relative to the carriage in a direction parallel to said axes, gear means connecting the pattern and work piece for synchronous rotation, said gear means including a differential gear having a gear carrier, and means to turn said gear carrier thereby to turn the pattern and work piece relatively to each other.

8. A forming machine comprising means to support a pattern and work piece for rotation about parallel axes, a carriage carrying a follower and a forming tool engageable with the pattern and work piece respectively, said means being movable relative to the carriage in a direction parallel to said axes, gear means connecting the pattern and work piece for synchronous rotation, said gear means including a differential gear having a gear carrier, a cam, and a member carried by said gear carrier and engaging said cam to turn the pattern and work piece relatively to each other.

9. A forming machine comprising a base, a longitudinally movable table on said base, a rotatable pattern support on said table, a rotatable support for a work piece on said table, a gear chain connecting said supports for synchronous rotation, and means operated by longitudinal movement of the table relative to the base for adjusting said gear chain thereby to turn the pattern and work piece relatively to each other.

10. A forming machine comprising a longitudinally movable table, a rotatable pattern support on said table, a rotatable support for a work piece on said table, a gear chain connecting said supports for synchronous rotation, said gear chain including a differential gear having a rotatably mounted gear carrier, and means operated by longitudinal movement of the table for turning said gear carrier for turning one of said supports relatively to the other.

11. A forming machine comprising a longitudinally movable table, a rotatable pattern support on said table, a rotatable support for a work piece on said table, a gear chain connecting said supports for synchronous rotation, said gear chain including a differential gear having a rotatably mounted gear carrier, a stationary cam, and a member carried by said gear carrier and engaging the cam to turn the gear carrier as the table moves longitudinally.

12. A forming machine comprising a longitudinally movable table, a rotatable pattern support on said table, a rotatable support for a work piece on said table, a gear chain connecting said supports for synchronous rotation, a pivotally mounted carriage, a follower and a forming tool on the carriage engageable with the pattern and the work piece respectively, and means operated by longitudinal movement of the table to turn the pattern and work piece relatively to each other.

13. A forming machine comprising a longitudinally movable table, a rotatable pattern support on said table, a rotatable support for a work piece on said table, a gear chain connecting said supports for synchronous rotation, a carriage pivoted about an axis at right angles to said table, a follower and forming tool rotatably mounted on the carriage on spaced axes parallel to the table and engageable with the pattern and forming tool respectively, power means on the carriage for driving the forming tool and means operated by movement of the table to turn the pattern and work support relatively to each other.

14. A forming machine comprising means for rotatably supporting a work piece, means for rotatably supporting a pattern beside the work piece, power means for synchronously rotating the work piece and pattern, a pivotally mounted carriage carrying a follower and forming tool eccentric to its pivotal axis and engageable with the pattern and work piece respectively, said work piece and pattern being movable relative to the carriage at substantially a right angle to the pivotal axis of the carriage, and means operated by said relative movement to turn the work piece and pattern relative to each other.

HENRY A. BERLINER.